US009991009B2

(12) United States Patent
Berthold et al.

(10) Patent No.: US 9,991,009 B2
(45) Date of Patent: Jun. 5, 2018

(54) ELECTRICAL FEEDTHROUGHS FOR NUCLEAR REACTOR (71) Applicant: BWXT mPower, Inc., Charlotte, NC (US)

(72) Inventors: Michael S. Berthold, Holly Springs, NC (US); Scott J. Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 1164 days.

(21) Appl. No.: 13/863,972

(22) Filed: Apr. 16, 2013

(65) Prior Publication Data
US 2013/0301777 A1 Nov. 14, 2013

Related U.S. Application Data (60) Provisional application No. 61/625,378, filed on Apr. 17, 2012.

(51) Int. Cl.
*G21C 13/036* (2006.01)
*G21C 7/12* (2006.01)
*G21C 17/116* (2006.01)
*G21C 1/32* (2006.01)

(52) U.S. Cl.
CPC ........... *G21C 13/036* (2013.01); *G21C 7/12* (2013.01); *G21C 17/116* (2013.01); *G21C 1/32* (2013.01); *Y02E 30/40* (2013.01)

(58) Field of Classification Search
CPC .. G21C 17/116; G21C 13/036; G21C 13/032; G21C 13/028; G21C 13/0285
See application file for complete search history.

(56) References Cited

U.S. PATENT DOCUMENTS

| 3,781,453 A | 12/1973 | Funk et al. |
| 4,261,794 A | 4/1981 | Yue |
| 4,420,456 A | 12/1983 | Nickel et al. |
| 4,569,817 A | 2/1986 | Underwood |
| 4,765,947 A | 8/1988 | Babin et al. |
| 4,983,351 A | 1/1991 | Tower et al. |
| 5,232,517 A | 8/1993 | Hilborn et al. |
| 5,305,357 A | 4/1994 | Ekeroth |
| 5,444,747 A | 8/1995 | Terhune |

(Continued)

OTHER PUBLICATIONS

International Search Report and Written Opinion for PCT/US2013/036864 dated Sep. 27, 2013.

(Continued)

*Primary Examiner* — Sharon M Davis
(74) *Attorney, Agent, or Firm* — Nelson Mullins Riley & Scarborough LLP (57) ABSTRACT A nuclear reactor includes a nuclear reactor core comprising fissile material and a pressure vessel containing the nuclear reactor immersed in primary coolant water at an operating pressure. The pressure vessel has a vessel penetration passing through a wall of the pressure vessel. An electrical feedthrough seals the vessel penetration and has an outside electrical connector mounted at the pressure vessel. The outside electrical connector is at atmospheric pressure. The electrical feedthrough may include a flange disposed inside the pressure vessel and sealing against an inside surface of the wall of the pressure vessel. The outside electrical connector of the electrical feedthrough may be inset into the wall of the pressure vessel.

22 Claims, 5 Drawing Sheets

(56) References Cited

U.S. PATENT DOCUMENTS

| | | |
|---|---|---|
| 5,483,560 A | 1/1996 | Potz et al. |
| 2005/0186823 A1 | 8/2005 | Ring et al. |
| 2008/0017415 A1 | 1/2008 | Suter et al. |
| 2012/0076254 A1 | 3/2012 | Malloy et al. |
| 2013/0287157 A1 | 10/2013 | Conway et al. |

OTHER PUBLICATIONS

Extended European Search Report dated Nov. 19, 2015 for European Application No. 13777956.7.

ELECTRICAL FEEDTHROUGHS FOR NUCLEAR REACTOR

This application claims the benefit of U.S. Provisional Application No. 61/625,378, filed Apr. 17, 2012. U.S. Provisional Application No. 61/625,378, filed Apr. 17, 2012 is hereby incorporated by reference in its entirety into the specification of this application.

BACKGROUND

The following relates to the nuclear reactor arts, nuclear power generation arts, nuclear reactor instrumentation arts, nuclear vessel feedthrough arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. In the integral PWR design, the at least one steam generator is located inside the pressure vessel, typically in the downcomer annulus. Some illustrative integral PWR designs are described in Thome et al., "Integral Helical Coil Pressurized Water Nuclear Reactor", U.S. Pub. No. 2010/0316181 A1 published Dec. 16, 2010 which is incorporated herein by reference in its entirety. Other light water nuclear reactor designs such as PWR designs with external steam generators, boiling water reactors (BWRs) or so forth, vary the arrangement of the steam generator and other components, but usually locate the radioactive core at or near the bottom of a cylindrical pressure vessel in order to increase the likelihood that the reactor core will remain submerged in coolant in a loss of coolant accident (LOCA).

The nuclear reactor core is built up from multiple fuel assemblies. Each fuel assembly includes a number of fuel rods. Spaced vertically along the length of the fuel assembly are grid assemblies which provide structural support to the fuel rods. At the top and bottom of the fuel assembly are an upper end fitting and a lower end fitting, respectively, providing structural support. The fuel assembly also includes guide tubes interspersed among the fuel rods. The guide tubes are welded to the grid assemblies as well as the upper and lower end fittings to form the structural support for the fuel assembly. Multiple fuel assemblies are welded or otherwise attached to each other to form a core, which is contained in a core former. The entire core is supported in a core basket, which may be suspended from the reactor lower vessel flange. Control rods comprising neutron absorbing material are inserted into and lifted out of the guide tubes of the fuel assembly to control core reactivity. Instruments that monitor core conditions (e.g. reactor power, temperature, pressure, flow, neutron flux, etc.) and their accompanying cabling may also be inserted into some of the guide tubes. Generally, a guide tube contains either a control rod or an instrument but not both, due to space limitations.

The instruments and associated cabling are called incores because they are located in the core. While it is preferred that the incores be located in a guide tube in the center of the fuel assembly, they may also be located at the edge of a fuel assembly due to the arrangement of other core components. Generally, not all fuel assemblies contain an incore, and the fuel assemblies that do contain an incore only contain one. Locating these instruments in the reactor core, or anywhere in the vessel, is a challenge because the reactor vessel contains high temperature and high pressure water and the core produces radiation, an inhospitable environment for electronics.

One approach for instrumentation in nuclear reactors uses thimble tubes contained in conduits, as disclosed in, for example, U.S. Pat. No. 5,120,491 to Brown et al., filed Sep. 17, 1991 and U.S. Pat. No. 4,983,351 to Tower et al., filed May 1, 1989. In this approach, thimble tubes housed in conduits run from a seal table through the vessel and into the core. The thimble tubes enter the reactor vessel at either the vessel head or the bottom of the vessel to provide a straight line to the core. Multiple thimble tubes are terminated at the seal table located outside of the reactor, for example in a dedicated compartment separate from the reactor compartment.

A problem with this approach is that a failure of a conduit or a seal table connection can cause an unisolable primary leak. Although the resulting leak would be small and within the capacity of the coolant charging pumps, it may still necessitate reactor shutdown. Another problem with the thimble and conduit design is that, if routed from the bottom of the vessel, a leak from around the vessel penetration would, in the absence of any action, cause the core to become uncovered.

In the case of control rods, the usual approach is to employ control rod drive mechanisms (CRDMs) with motors that are mounted externally at the top of the reactor vessel. There is currently interest in relocating the CRDM motors inside the pressure vessel, so as to facilitate compact small modular reactor (SMR) designs and to eliminate the CRDM as a potential LOCA source. Electrically driven CRDMs in which the motor is located in the vessel are called internal CRDMs. A disadvantage of internal CRDMs is that they necessitate a large number of electrical penetrations through the pressure vessel for the power, control, and signal (e.g., position indicator sensor) lines required for operating the CRDMs. These lines would add further thimble tube/conduit lines, and would further burden the (typically already heavily loaded) seal table.

Disclosed herein are improvements that provide various benefits that will become apparent to the skilled artisan upon reading the following.

BRIEF SUMMARY

In one aspect of the disclosure, an electrical feedthrough including: a cylinder having an outside end and an inside end and a lumen passing between the outside end and the inside end; a flange connected to and sealed with the inside end of the cylinder but not sealing the lumen at the inside end of the cylinder; an electrical termination disposed in the cylinder and sealing the lumen of the cylinder; an outside electrical connector disposed at the outside end of the cylinder; and at least one electrical conductor passing through at least a portion of the lumen and having an end terminating at the electrical termination. The electrical feedthrough is configured to mount at a vessel penetration of a pressure vessel wall with the flange sealed against an inside surface of the pressure vessel wall, the cylinder passing through the vessel penetration of pressure vessel wall, and the outside electrical connector accessible from outside the pressure vessel. In some embodiments, the electrical feedthrough includes an end plate is disposed at the outside end of the cylinder and at least one pressure fitting/connector sealed with and passing through the end plate, the end plate and the at least one pressure fitting/connector sealing the lumen of the cylinder at the outside end of the cylinder. In these embodiments, the pressure fitting/connector includes the electrical connector disposed at the outside end of the cylinder. In some embodiments, the electrical termination of the electrical feedthrough comprises a hermetically sealed connector disposed at the inside end of the cylinder and sealing the lumen of the cylinder at the inside end of the cylinder, and the at least one electrical conductor passes through the cylinder to electrically connect the hermetically sealed connector at the inside end of the cylinder and the outside electrical connector at the outside end of the cylinder.

In another aspect of the disclosure, a nuclear reactor comprises a feedthrough and a pressure vessel as set forth in the immediately preceding paragraph, and a nuclear reactor core comprising fissile material disposed inside the pressure vessel, the pressure vessel further containing primary coolant water at an operating pressure, wherein the apparatus comprises a nuclear reactor.

In another aspect of the disclosure, an apparatus comprises: a nuclear reactor including a nuclear reactor core comprising fissile material and a pressure vessel containing the nuclear reactor immersed in primary coolant water at an operating pressure, the pressure vessel having a vessel penetration passing through a pressure vessel wall; and an electrical feedthrough sealing the vessel penetration and having an outside electrical connector mounted at the pressure vessel, the outside electrical connector being at atmospheric pressure.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
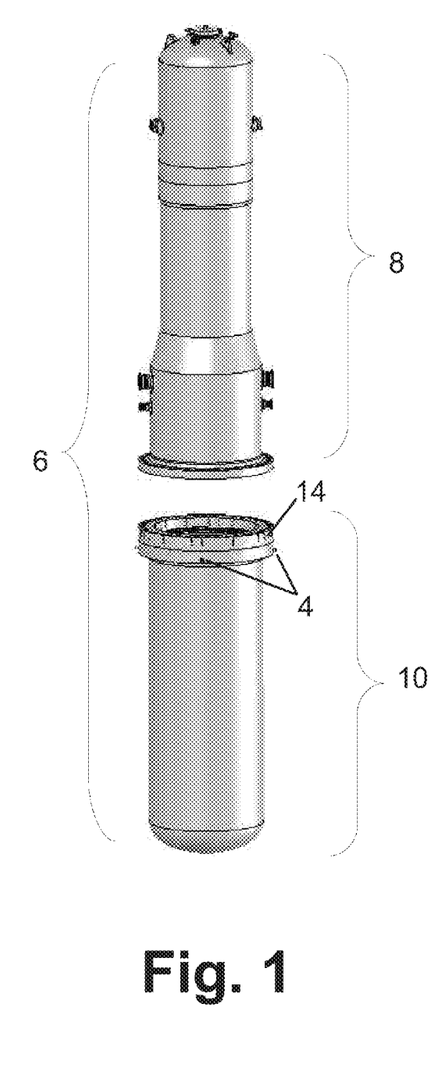
FIG. 1 diagrammatically shows a nuclear reactor including illustrative pressure penetrations as disclosed herein.

FIG. 1 illustrates an integral reactor pressure vessel 6 including an upper vessel 8 and a lower vessel 10. The vessel portions 8, 10 are joined at a mid-flange 14 during operation, but FIG. 1 shows the upper vessel 8 lifted off the lower vessel/midflange 10, 14 (e.g., for refueling). which are shown separated in FIG. 1. The lower vessel 10 includes illustrative feedthroughs 4. In an integral reactor, the vessel houses the reactor core, reactor internals, and steam generator in a common pressure boundary, i.e. in the pressure vessel 6. The integral reactor of FIG. 1 is designed so that the upper vessel 8 contains the steam generators and may be removed as a unit (including the steam generators) for refueling.

A common design goal for any reactor is to minimize the number of reactor vessel penetrations, but penetrations cannot be completely avoided as core components must have electrical, hydraulic, and instrumentation lines enter the reactor. Examples of core components that need electrical power or instrumentation lines are control rod drive mechanisms and incore instruments.

Regarding the incore instruments, in some previous reactor designs, thimble guide tubes have provided the connections for the incores (instruments located in the reactor core), entering at either the top or bottom of the reactor vessel. Either location allows the tubes to run in a straight route: from the top of the vessel to the top of the core or, alternatively, from the bottom of the vessel to the bottom of the core. While having the thimble tubes enter the core from the bottom is desirable because it avoids interference with the control rods at the top of the core, penetrations in the bottom of the vessel are undesirable because they require draining the vessel for repair and, in an extreme Loss of Coolant Accident (LOCA), could inhibit the core from being submerged in coolant.

Placing the incore penetrations at the top of the reactor in an integral reactor is also undesirable due to length and difficulty of routing around upper reactor components such as the control rod assemblies. If the reactor includes an integral pressurizer at the top of the reactor vessel, this further complicates routing of electrical cables from above the reactor. Cabling that runs from above the reactor also typically must be removed to provide access to the reactor core during refueling. Thus, routing the cables from the top of the vessel is undesirable. Routing from the bottom is also undesirable because it requires vessel penetrations below the core region. For these reasons, it is desirable to route cables from the side of the reactor vessel in an integral pressurized water reactor.

Note that the term "guide tube" as used in the art may refer not only to the guide tube within the reactor core for guiding a control rod or incore, but also to the tube or conduit that houses a thimble tube outside of the core. To avoid confusion, the tube that houses the incore cabling outside of the core is referred to herein as a "routing tube." The term "guide tube" is used herein to refer to the tube that is part of the reactor core. Also note that, in some embodiments disclosed herein, mineral insulated (MI) cabling replaces the thimble tubes, eliminating the need for a sealing table. In such embodiments, routing tubes provide support for the MI cables from the guide tube to the vessel wall, preventing flow induced vibration from damaging the cables. Because the routing tube does not exit the reactor, it need not be pressure tight.

Figure 2:
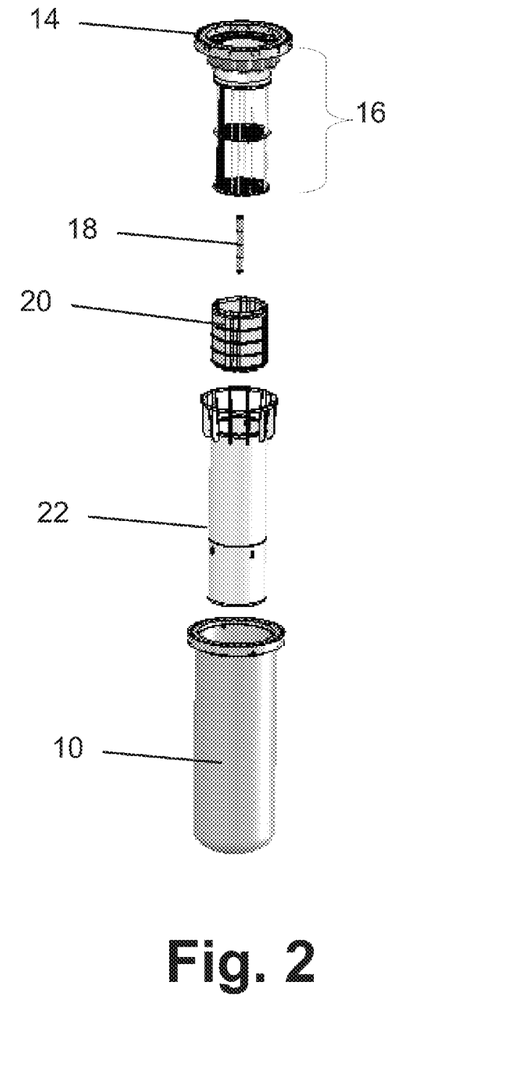
FIG. 2 diagrammatically shows an exploded view of principle components of the lower vessel of the reactor of FIG. 1.

FIG. 2 shows the components contained in the illustrative lower vessel 10: upper internals 16 which are suspended from the mid-flange 14, an illustrative fuel assembly 18 (the reactor core comprises an array of such fuel assemblies), a core former 20, and core basket 22. The upper internals 16 may include components such as control rod guide frames that guide the control rod assemblies, internal CRDMs, internal reactor coolant pumps (RCPs), and so forth. (In FIG. 2, the upper internals 16 are illustrated showing only the structural frame including hanger plates and tie rods, and a set of RCPs at the mid-flange 14; however, in some embodiments the internal RCPs may be omitted in favor of externally mounted RCPs).

In operation, the reactor pressure vessel contains primary coolant water at an operating temperature and pressure controlled by reactivity control of the core (e.g., using control rods, optional soluble neutron poison, or so forth) and pressure control provided by an internal or external pressurizer. The illustrative reactor is a PWR in which the primary coolant is maintained in a subcooled state, and includes an internal pressurizer comprising a steam bubble at the top of the upper vessel 8 and pressure control elements such as resistive heaters, spargers, or so forth (details not shown). The illustrative reactor is suitably operated at a pressure of about 2000 psia (14 MPa), and the electrical feedthroughs 4 are rated for an operating pressure of at least 2000 psia (14 MPa). In other reactor designs the design pressure may be higher or lower. For example, in a reactor with less stringent pressure requirements, the operating pressure may be around 1000 psia (7 MPa) and the electrical feedthroughs 4 are pressure tight at least for pressures up to 1000 psia (7 MPa).

The exterior of the pressure vessel is at atmospheric pressure. As used herein, the term "atmospheric pressure" simply indicates the pressure of the atmosphere surrounding the pressure vessel. Typically, this is true atmospheric pressure, i.e. corresponding to the pressure of the atmosphere at the location of the nuclear reactor. However, it is contemplated for the pressure vessel to be disposed in a controlled atmosphere whose pressure is not precisely at true atmospheric pressure. For example, the pressure vessel may be disposed in a containment that is at a slight negative pressure to reduce likelihood that any airborne contaminants escapes the containment. In such an embodiment, "atmospheric pressure" suitably denotes this pressurized or negative pressure atmosphere surrounding the pressure vessel.

Core parameters such as pressure, temperature, flow, and neutron flux may be monitored by various incores (that is, incore instruments and associated cables). Each incore is mounted in a guide tube in the core, and its cabling runs from the instrument, down the guide tube, and out of the core. Outside of the core, the cabling is protected from flow induced vibration by a routing tube or conduit which houses the cabling run to the vessel wall. By way of illustrative example, in the case of a neutron flux detector, there may be several Rhodium emitter type sensors mounted in a cable that is inserted into one of the guide tubes and connected to a material insulated cable. In one embodiment, five instruments are place along the height of the core in a guide tube. An Inconel sheath may protect the instruments.

Figure 3:
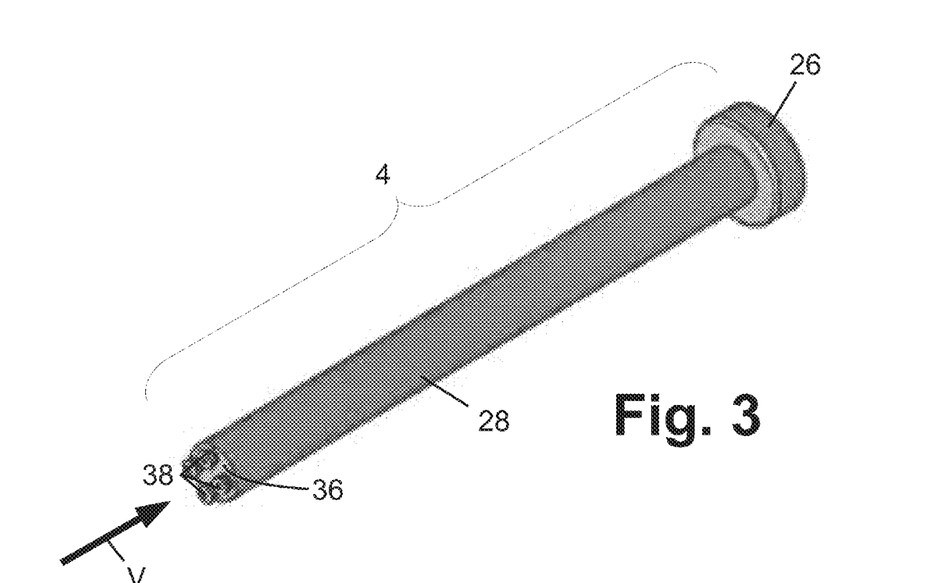
FIG. 3 shows a perspective view of one embodiment of the feedthrough for the incore cable connectors.
Figure 4:
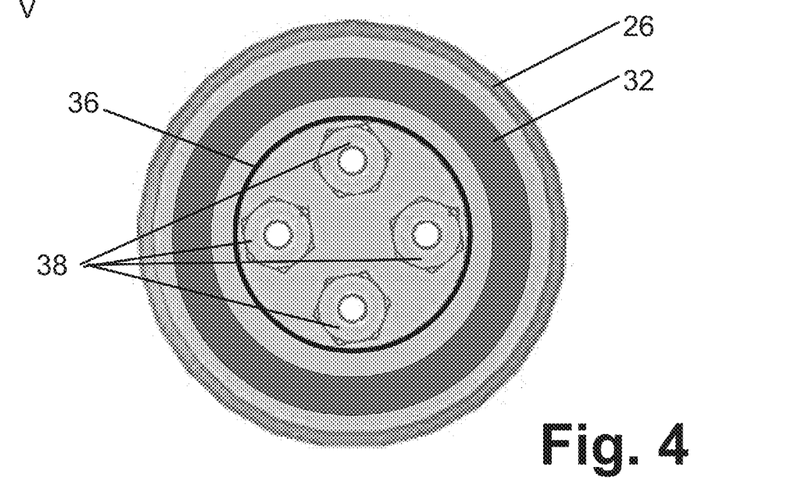
FIG. 4 is an end view of the feedthrough of FIG. 3 viewed along the direction (V) indicated in FIG. 3.
Figure 5:
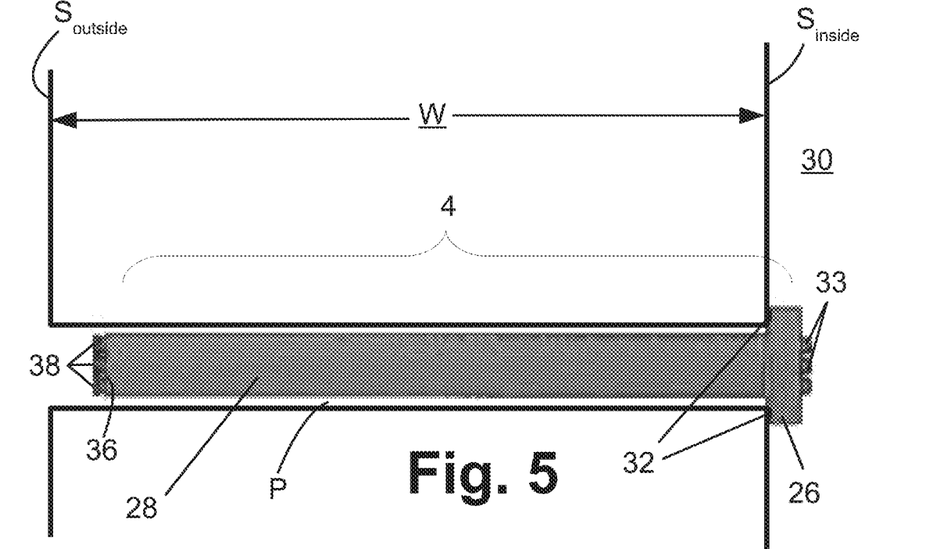
FIG. 5 is a profile view of the feedthrough of FIG. 3 diagrammatically shown installed passing through the pressure vessel wall.

With returning reference to FIG. 1 and with further reference to FIGS. 3-6, the incore cabling preferably exits the reactor vessel at feedthrough 4 without creating a weak point in the reactor vessel. With reference to FIG. 3, a suitable embodiment of the feedthrough 4 includes a pressure retaining flange 26 connected to an elongated tube or cylinder 28 which provides the passageway for electrical conductors. (Although the illustrative tube or cylinder 28 has a circular cross-section, other cross sectional shapes such as a square or hexagonal cross-section are also contemplated). FIG. 4 is an end view of the feedthrough 4 viewed along the direction V indicated in FIG. 3. FIG. 5 shows a sectional view of a vessel penetration P through a wall W of the pressure vessel. The wall W has an outside surface $S_{outside}$ and an inside surface $S_{inside}$. The interior volume of the pressure vessel is denoted by reference number 30 in FIG. 5. The pressure retaining flange 26 is located at an inside end of the cylinder 28 and is mounted to the inside surface $S_{inside}$ of the pressure vessel, and may be secured and sealed by an annular weld 32 as diagrammatically indicated in FIGS. 4 and 5. In this arrangement, the pressure of the primary coolant water contained in the interior 30 of the pressure vessel presses the flange 26 against the inside surface $S_{inside}$ of the pressure vessel wall W, which promotes pressure retention. The seal provided by the weld 32 seals the vessel penetration P. (In an alternative embodiment, the flange 26 is secured to the inside surface $S_{inside}$ of the pressure vessel wall W by bolts threading into blind holes in the wall W, and the seal is provided by a gasket or o-ring that is compressed by the flange 26 against the wall W, so that the gasket or o-ring substitutes for the weld 32).

Figure 6:
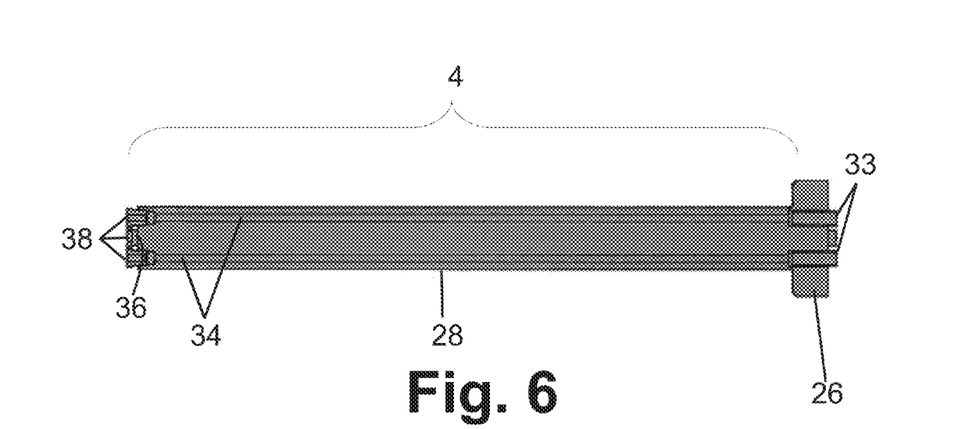
FIG. 6 is a side sectional view of the feedthrough of FIG. 3.
Figure 7:
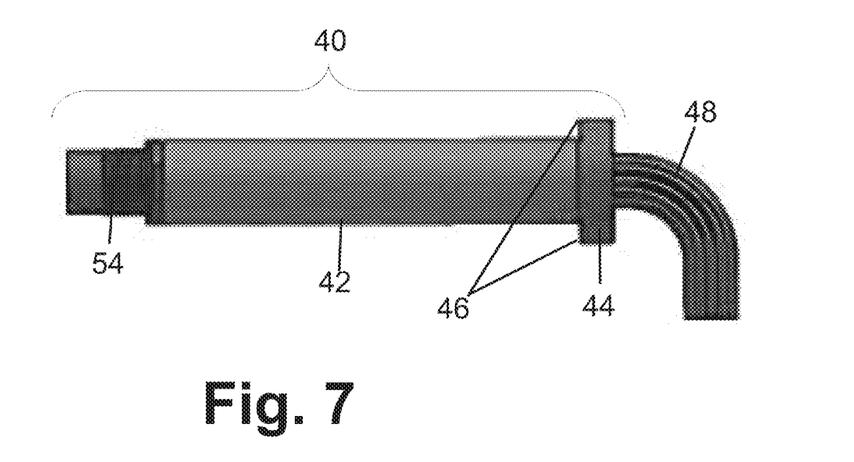
FIG. 7 depicts one embodiment of a feedthrough suitable for CRDM electrical connectors.

As seen in FIG. 6, the elongated cylinder 28 is hollow and provides a passageway or lumen for guide tubes 34 sheathing electrical cables. The lumen of the elongated cylinder 28 is not sealed by the weld 32, and the flange 26 includes openings 33 through which the guide tubes 34 pass (see FIGS. 5 and 6). The openings 33 may be unadorned holes in the flange 26, or alternatively collars or the like may be disposed in the holes in the flange 26 to support the guide tubes 34 (as illustrated). In either case, the interior of the elongated cylinder 28 is in fluid communication with the interior 30 of the pressure vessel and is considered to be at interior pressure. An end plate 36 closes off the cylinder 28 at the end opposite from the flange 26. The end plate 36 is sealed to the elongated cylinder 28 to provide a pressure-tight termination of the cylinder 28. Each electrical cable sheathed by a guide tube 34 terminates at the end plate 36 via a pressure fitting/connector 38. In illustrative FIGS. 3-6 there are four cables sheathed by guide tubes 34, and hence there are four pressure fitting/connectors 38; however, the number of cables and pressure fitting/connectors can be 1, 2, 3, 4, 5, 6, or higher. Thus, the combination of the end plate 36 and pressure fitting/connectors 38 define an electrical termination disposed in the cylinder 28, namely at an outside end of the cylinder 28 in this embodiment, and the electrical termination 36, 38 seals the lumen of the cylinder 28 at the outside end of the cylinder 28. In this embodiment the pressure fitting/connectors 38 also provide external connectors at atmospheric pressure for electrical connection to the electrical feedthrough from outside the pressure vessel.

Thus, the feedthrough 4 includes two seals. The first seal is provided by the flange 26 and the weld 32, and seals the vessel penetration P—but the elongated cylinder 28 passing through or at least partway into the vessel penetration P is at interior pressure (that is, at the operating pressure of the pressure vessel). The second seal is provided by the end plate 36 and the pressure fitting/connectors 38, and seals the outside end of the cylinder 28, that is, the end distal from the flange 26.

The lumen of the elongated cylinder 28 can take various forms. In one approach, the elongated cylinder 28 has a single lumen (i.e., channel) and all cables pass through that single lumen. In this embodiment the cylinder 28 is substantially hollow and the lumen is suitably coaxial with the cylinder 28. This embodiment has advantages including manufacturing simplicity and the ability to accommodate different numbers of cables by modifying the end plate 36 and the flange 26. (Indeed, in this embodiment the openings 33 in the flange 26 optionally are replaced by a single opening large enough to pass all electrical cables, thus making the flange 26 also capable of accommodating different numbers of cables).

Alternatively, the cylinder 28 can be substantially solid with multiple lumens (i.e., channels) passing through, with one lumen for each electrical cable. For example, if there are four electrical cables this embodiment would have four lumens disposed inside the cylinder 28. This embodiment has advantages including a higher overall flow resistance in the event of a LOCA occurring at the feedthrough 4 (assuming the LOCA occurs at only one of the four lumens).

The guide tubes 34 protect the electrical cabling from exposure to the pressure and causticity of the environment inside the pressure vessel. In some embodiments, it is contemplated to employ mineral insulated cables (MI cables) with mineral insulation and metal sheathing that are capable of standing up to the environment inside the pressure vessel. In such embodiments, the guide tubes 34 are optionally omitted and the MI cables routed into the cylinder 28 without guide tubes.

Although the illustrative flange 36 is circular, other shapes are contemplated. Whatever shape is used, the entire perimeter should be sealed by the weld 32 to create the pressure seal for vessel penetration P of the reactor vessel. In the case of a cylindrical pressure vessel or other pressure vessel configuration in which the inside surface $S_{inside}$ has substantial curvature, the inside surface $S_{inside}$ of the wall W of the pressure vessel is suitably machined flush or built up with filler to accept the flat flange. Alternatively, the flange could be machined to match the curvature of the inside surface $S_{inside}$. As previously mentioned, instead of welding the pressure retaining flange 26 can be secured by threaded fasteners (e.g. bolts as already mentioned, or studs welded to the interior of the pressure vessel) with a gasket providing the pressure seal. Welding is expected to provide a more reliable seal, but an arrangement secured by removable fasteners may be preferable if the feedthrough 4 is expected to be removed on occasion. In the case of the weld 32, the flange 26 may optionally have an annular J-groove (not shown) to accommodate the weld filler material.

Each electrical cable is terminated at its pressure fitting/connector 38 at the exterior of the vessel. In some suitable embodiments, the pressure fitting 38 may be a compressed gland or metal compression seal. The lumen or lumens (i.e., channel or channels) of the cylinder 28 contain primary pressure up to the pressure fitting 38. If the guide tubes 34 are used in combination with MI cables, then the MI cable is housed inside (i.e., sheathed by) the guide tube 34. The length of the elongated cylinder 28 may be chosen to be long enough so that the end plate 36 protrudes from the vessel wall (i.e., extends outside of the outer surface $S_{outside}$), or the cylinder length may be chosen so that the end plate 36 is flush with the vessel wall, or the cylinder length may be chosen to be short enough so that the end plate 36 is inset into the wall (as diagrammatically shown in FIG. 5). The illustrated inset configuration advantageously protects the fittings 38 from inadvertent contact, but may make it more difficult to reach the fittings 38 for installation, removal, or maintenance. The optional use of a standard commercially available pressure fitting simplifies servicing of the incores and may reduce component cost, and additionally a standard fitting can be serviced with standard tools.

With reference to FIGS. 7-10, another feedthrough embodiment is described. The feedthrough 40 of FIGS. 7-10 is well suited for use in feeding CRDM electrical connections or connections of other types in which there is a large number of electrical cables. The feedthrough 40 again includes a tube or cylinder 42 attached (e.g. welded or forged in one piece) to a flange 44. The flange 44 is again welded to the inside of the pressure vessel by an annular weld at the circumference 46, optionally having a j-groove for weld filler material. Multiple MI cables 48 from the CRDMs attach at the flange 44. The MI cables 48 may include CRDM power cables, CRDM instrumentation cables (e.g., rod bottom and rod height indicator cables), or so forth. Moreover, while an illustrative internal CRDM feedthrough application is described in conjunction with the feedthrough 40, it will be understood that the feedthrough 40 can be used in conjunction with electrical cables for any purpose.

Figure 8:
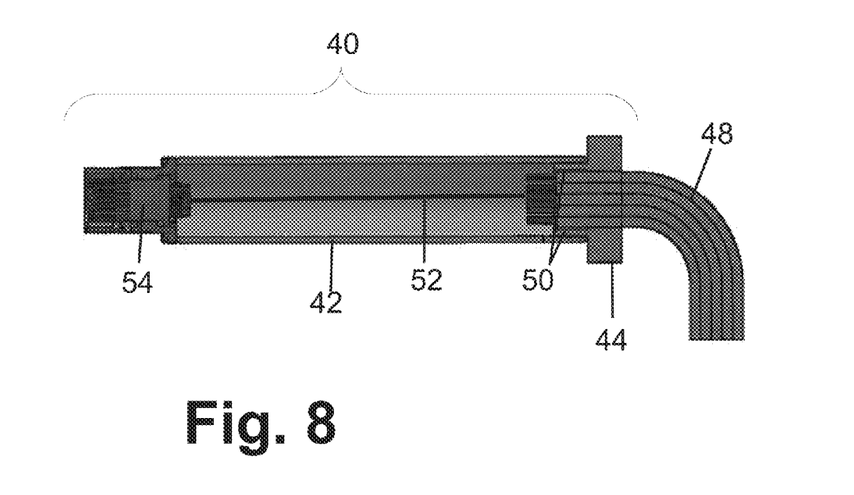
FIG. 8 shows a side sectional view of the feedthrough of FIG. 7.
Figure 9:
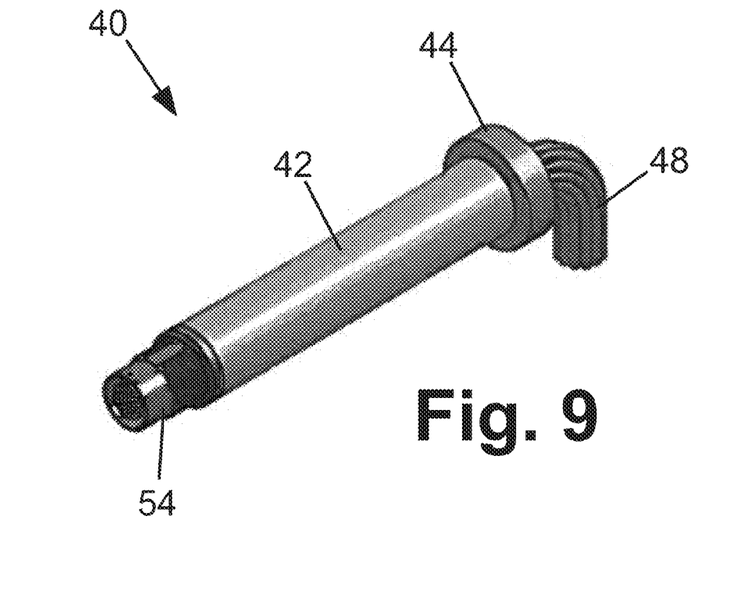
FIG. 9 is a perspective view of the feedthrough of FIG. 7
Figure 10:
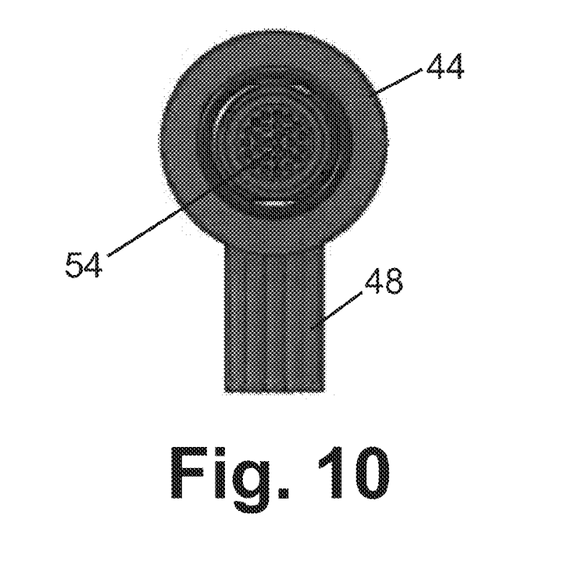
FIG. 10 is a detail of the exterior connector of the feedthrough of FIG. 7.

With reference to FIG. 8, in this embodiment the flange 44 contains an electrical termination in the form of a hermetically sealed connector 50, which may be a sealed glass connector, a sealed ceramic connector, a sealed glass ceramic connector, or so forth. The MI cables 48 plug into this connector 50. On the opposite side of the sealed connector 50, conductors (for illustration, only one conductor 52 is shown) inside the sealed tube 42 run from the hermetically sealed connector 50 to an exterior (i.e., outside) connector 54. In this embodiment the outside electrical connector 54 is at the outside end of the cylinder 42 and the electrical termination 50 is at the inside end of the cylinder 42. The tube or cylinder 42 in this embodiment does not need to be pressure tight as the hermetic seal 50 is the pressure boundary. Indeed, the lumen of the cylinder 42 can be at atmospheric pressure up to the seal provided by the hermetically sealed connector 50. The outside connector 54 is also not under pressure and may therefore be a conventional heavy duty, multi-pin connector. As with the embodiment of FIGS. 3-6, the connector 54 may protrude from the outer vessel wall, be flush with the vessel wall, or may be inset into the wall.

In the embodiment of FIGS. 7-10, the MI cables 48 do not pass through the feedthrough 40, but instead terminate at (plug into) the sealed connector 50. The feedthrough 40 has connectors at either end: one connector for the terminated MI cable and one exterior to the vessel to connect to the instrumentation system. Conductors housed in the insulated tube 42 connect the two connectors. The tube itself may optionally also include mineral insulation. The pressure retaining flange 44 is permanently attached to the insulated tube 42 and is pressure tight, so no coolant enters the tube 42. The pressure retaining flange 44 also ensures that coolant does not leak between the sleeve and the vessel (i.e., thorough the vessel penetration around the outside of the tube 42).

For connecting internal CRDMs, the feedthroughs 40 suitably pass through the mid-flange 14. This is advantageous because it allows the cables connected to the CRDMs to be removed with the mid-flange and upper-internals (see FIG. 2) during refueling. In a suitable configuration the feedthroughs 40 are oriented horizontally, and the bend in the MI cables 48 as they extend away from the flange 44 can be made gradually (to accommodate the limited bend radius of typical MI cables) until the MI cables are oriented vertically. However, it is alternatively contemplated that the CRDM feedthroughs pass through the upper or lower vessel. The MI cables may be covered with a seal weld at the pressure flange 44 to protect the electrical connectors.

The disclosed electrical feedthroughs are described with illustrative applications to a nuclear reactor. However, it will be appreciated that the disclosed electrical feedthroughs may find application in other environments that employ a pressure vessel containing a working fluid at an operating pressure that is elevated as compared with atmospheric pressure (i.e., the pressure of the atmosphere surrounding the pressure vessel).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus for a nuclear reactor pressure vessel including a pressure vessel wall with a vessel penetration, the apparatus comprising:
   an electrical feedthrough including:
   a cylinder having an outside end and an inside end and a lumen passing between the outside end and the inside end,
   a flange connected to and sealed with the inside end of the cylinder but not sealing the lumen at the inside end of the cylinder,
   an electrical termination disposed in the cylinder and sealing the lumen of the cylinder,
   an outside electrical connector disposed at the outside end of the cylinder, and
   at least one electrical conductor passing through at least a portion of the lumen and having an end terminating at the electrical termination, the electrical feedthrough being mounted at the vessel penetration with the flange sealed against an inside surface if the pressure vessel wall, the cylinder passing through the vessel penetration of pressure vessel wall, and the outside electrical connector accessible from outside the pressure vessel,
   wherein the lumen of the cylinder is adapted to maintain structural integrity of the pressure vessel at normal operating pressure of the nuclear reactor, and
   wherein the outside end of the cylinder of the electrical feedthrough is disposed in the vessel penetration, radially inward of an outer surface of the vessel wall.

2. The apparatus of claim 1 wherein the electrical termination of the electrical feedthrough comprises:
   an end plate disposed at the outside end of the cylinder and at least one pressure fitting/connector sealed with and passing through the end plate, the end plate and the at least one pressure fitting/connector sealing the lumen of the cylinder at the outside end of the cylinder;
   wherein the pressure fitting/connector includes said electrical connector disposed at the outside end of the cylinder.

3. The apparatus of claim 2 wherein the pressure vessel is at an operating pressure and the lumen of the cylinder is at the operating pressure up to the outside end of the cylinder where the end plate and the at least one pressure fitting/connector seals against the operating pressure.

4. The apparatus of claim 3 wherein the operating pressure is at least 1000 psia.

5. The apparatus of claim 3 wherein the seal of the lumen at the outside end of the cylinder is provided by the end plate and the at least one pressure fitting/connector is rated for at least 2000 psia.

6. The apparatus of claim 1 wherein the at least one electrical conductor passing through at least a portion of the lumen is a mineral insulated cable (MI cable).

7. The apparatus of claim 1 wherein the at least one electrical conductor passing through at least a portion of the lumen is disposed inside a guide tube.

8. The apparatus of claim 1 further comprising:
   an annular weld sealing the flange of the electrical feedthrough against the inside surface of the pressure vessel wall.

9. The apparatus of claim 1 wherein the outside electrical connector is recessed into the vessel penetration.

10. The apparatus of claim 1 further comprising:
    a nuclear reactor core comprising fissile material disposed inside the pressure vessel, the pressure vessel further containing primary coolant water at an operating pressure, wherein the apparatus comprises a nuclear reactor.

11. The apparatus of claim 10 wherein the electrical feedthrough is electrically connected with an incore instrument disposed in the nuclear reactor core.

12. The apparatus of claim 1 wherein:
    the electrical termination of the electrical feedthrough comprises a hermetically sealed connector disposed at the inside end of the cylinder and sealing the lumen of the cylinder at the inside end of the cylinder; and
    the at least one electrical conductor passes through the cylinder to electrically connect the hermetically sealed connector at the inside end of the cylinder and the outside electrical connector at the outside end of the cylinder.

13. The apparatus of claim 12 wherein the hermetically sealed connector comprises a sealed glass connector.

14. The apparatus of claim 12 wherein the hermetically sealed connector comprises a sealed ceramic connector.

15. The apparatus of claim 12 further comprising:
    a pressure vessel including said pressure vessel wall with said vessel penetration, the electrical feedthrough being mounted at the vessel penetration with the flange sealed against the inside surface of the pressure vessel wall, the cylinder passing through the vessel penetration of pressure vessel wall, and the outside electrical connector accessible from outside the pressure vessel.

16. The apparatus of claim 15 wherein the hermetically sealed connector comprises a sealed glass or ceramic connector.

17. The apparatus of claim 15 wherein the pressure vessel is at an operating pressure and the lumen of the cylinder is at atmospheric pressure up to the inside end of the cylinder where the hermetically sealed connector seals against the operating pressure.

18. The apparatus of claim 17 wherein the operating pressure is at least 1000 psia.

19. The apparatus of claim 17 wherein the seal of lumen at the outside end of the cylinder provided by the end plate and the at least one pressure fitting/connector is rated for at least 2000 psia.

20. The apparatus of claim 15 further comprising:
    an annular weld sealing the flange of the electrical feedthrough against the inside surface of the pressure vessel wall.

21. The apparatus of claim 15 wherein the outside electrical connector is recessed into the vessel penetration.

22. The apparatus of claim 15 wherein the electrical feedthrough is electrically connected with an internal control rod drive mechanism (CDDM) disposed inside the pressure vessel.

* * * * *